United States Patent Office 2,841,072
Patented July 1, 1958

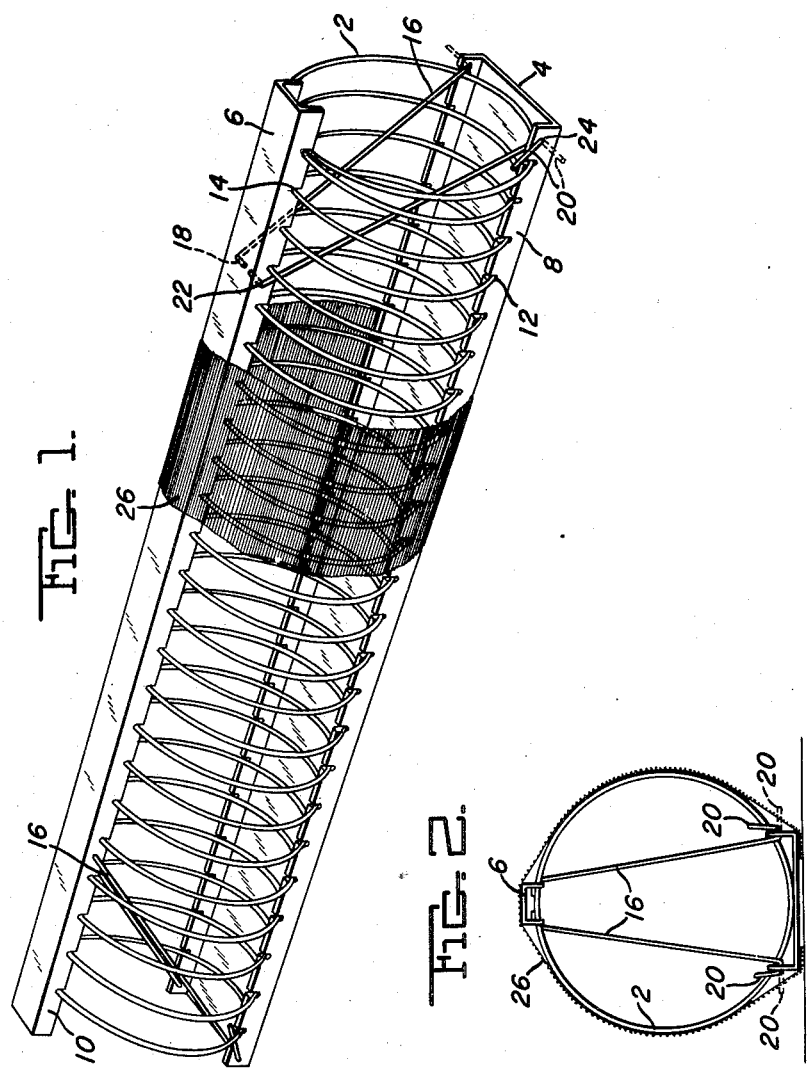
July 1, 1958 R. D. KNIGHT ET AL 2,841,072
VENTILATING DUCT
Filed Feb. 25, 1955
INVENTORS:
ROBERT D. KNIGHT and
THOMAS MELVILLE
BY: Donald G. Dalton
their Attorney.

2,841,072

VENTILATING DUCT

Robert D. Knight, Shaker Heights, and Thomas Melville, Maple Heights, Ohio, assignors to United States Steel Corporation, a corporation of New Jersey Application February 25, 1955, Serial No. 490,562

4 Claims. (Cl. 98—56)

This invention relates to a ventilating duct and more particularly to such a duct for delivering air into grain bins and the like. Wise Patent No. 2,580,872, dated January 1, 1952, discloses a duct for this same general purpose but the duct disclosed therein is particularly adapted for use in corn cribs or for light loads.

It is an object of our invention to provide a ventilating duct which is light and yet strong enough to withstand heavy loads.

Another object is to provide a ventilating duct which is easy to assemble and dis-assemble.

These and other objects will be more apparent after referring to the following specification and attached drawings, in which:

Figure 1 is a perspective view of the ventilating duct of our invention; and

Figure 2 is an end view of the duct of Figure 1.

Referring more particularly to the drawings, reference numeral 2 indicates a helical spring which is adapted to be supported between two channel members 4 and 6 preferably made out of sheet metal. The channel members 4 and 6 are provided with flanges 8 and 10, respectively, and are so arranged that their flanges 8 and 10 face each other. Flanges 8 and 10 are provided with spaced notches 12 and 14, respectively, for receiving the convolutions of the spring 2 to hold the same in spaced relationship. If the duct is to be used in a horizontal position the channel member 4 is preferably wider than the channel member 6 so as to provide a more stable assembly. A pair of preformed wire stays 16 are provided at each end of the duct and extend at an oblique angle between the channel members 4 and 6. Each of the wire stays 16 has a bend 18 at its upper end and a bend 20 at its lower end. Holes 22 and 24 are provided in the flanges 6 and 8 for receiving the wire stays 16. A mesh cloth 26, which may be ordinary screen wire, surrounds the spring 2 at least over the upper part thereof. For the sake of clarity the drawing shows the screen over only part of the length of the duct but it will be understood that the cloth will extend substantially the full length.

In assembly, the convolutions of the spring 2 are placed in the notches 12 and 14 in expanded position. The wire stays 16 are first passed through the holes 22 and then through holes 24 and the bent end 20 bent up from its broken line position to its full line position. The wire stays 16 strengthen the assembly. While this assembly may be used in this form for certain purposes it is preferred to drape the mesh cloth 26 around the outside thereof as shown. This prevents the grain from entering into the space within the spring 2 so that air can pass therethrough without obstruction. The assembly is placed in a building storing wheat, kernels of corn or the like with the grain being piled on and around the duct. With a duct made from .281 diameter wire spiraled with a three inch pitch in a 17 inch diameter, grain to a depth of 16 feet may be readily piled thereon. The duct may be made in a single length or separate lengths of duct may be connected in any suitable manner. If desired, a fan may be attached to the end of the duct to force air therethrough. When using the duct in a vertical position the channels 4 and 6 may be of the same width. When less strength is required a single channel member may be used to hold the convolutions in spaced relationship.

While one embodiment of our invention has been specifically shown it will be apparent that other adaptations and modifications may be made without departing from the scope of the following claims.

We claim:

1. A ventilating duct comprising a helical spring, two channel members on opposite sides of said spring arranged with their flanges facing each other, the flanges of said channel members having spaced notches therein for receiving the convolutions of said spring to hold the same in spaced relationship, and a pair of wire stays at each end of the duct extending at an oblique angle between and connected to said channel members.

2. A ventilating duct comprising a helical spring, two channel members on opposite sides of said spring arranged with their flanges facing each other, the flanges of said channel members having spaced notches therein for receiving the convolutions of said spring to hold the same in spaced relationship, a pair of wire stays at each end of the duct extending at an oblique angle between and connected to said channel members, and a mesh cloth at least partially surrounding said spring.

3. A ventilating duct comprising a helical spring arranged with its axis substantially horizontal, a bottom channel member having upstanding flanges, a top channel member having downwardly extending flanges, said bottom channel member having a base of greater width than the base of the top channel member, the flanges of said channel members having spaced notches therein for receiving the convolutions of said spring to hold the same in spaced relationship, and a pair of wire stays at each end of the duct extending at an oblique angle between and connected to said channel members.

4. A ventilating duct comprising a helical spring arranged with its axis substantially horizontal, a bottom channel member having upstanding flanges, a top channel member having downwardly extending flanges, said bottom channel member having a base of greater width than the base of the top channel member, the flanges of said channel members having spaced notches therein for receiving the convolutions of said spring to hold the same in spaced relationship, a pair of wire stays at each end of the duct extending at an oblique angle between and connected to said channel members, and a mesh cloth at least partially surrounding said spring.

References Cited in the file of this patent

UNITED STATES PATENTS

| | | |
|---|---|---|
| 1,286,265 | Fair | Dec. 3, 1918 |
| 2,580,872 | Wise | Jan. 1, 1952 |